United States Patent
Pallini, Jr. et al.

(10) Patent No.: US 8,894,101 B2
(45) Date of Patent: Nov. 25, 2014

(54) PROTECTED INTEGRAL METAL TO METAL SEAL

(75) Inventors: Joseph William Pallini, Jr., Tomball, TX (US); Kevin Edward O'Dell, Katy, TX (US)

(73) Assignee: Vetco Gray Inc., Houston, TX (US)

( * ) Notice: Subject to any disclaimer, the term of this patent is extended or adjusted under 35 U.S.C. 154(b) by 0 days.

(21) Appl. No.: 13/606,302

(22) Filed: Sep. 7, 2012

(65) Prior Publication Data

US 2014/0070526 A1   Mar. 13, 2014

(51) Int. Cl.
  *F16L 25/00* (2006.01)
(52) U.S. Cl.
  USPC .......................................... 285/333; 285/334
(58) Field of Classification Search
  CPC ...... E21B 17/042; E21B 17/08; F16L 15/004; F16L 15/001; F16L 15/003; F16L 15/00; F16L 19/0656
  USPC .................................................. 285/333, 334
  See application file for complete search history.

(56) References Cited

U.S. PATENT DOCUMENTS

| | | | | |
|---|---|---|---|---|
| 3,224,799 | A * | 12/1965 | Blose et al. ................ | 285/334 |
| 3,870,351 | A | 3/1975 | Matsuki | |
| 4,384,737 | A * | 5/1983 | Reusser .................... | 285/334 |
| 4,603,886 | A | 8/1986 | Pallini, Jr. et al. | |
| 4,770,444 | A * | 9/1988 | Hauk ....................... | 285/333 |
| 4,946,201 | A | 8/1990 | Tai | |
| 5,064,224 | A * | 11/1991 | Tai .......................... | 285/334 |
| 5,066,052 | A * | 11/1991 | Read ....................... | 285/334 |
| 5,505,502 | A * | 4/1996 | Smith et al. .............. | 285/334 |
| 5,964,486 | A * | 10/1999 | Sinclair ................... | 285/334 |
| 6,056,324 | A * | 5/2000 | Reimert et al. .......... | 285/334 |
| 6,478,344 | B2 * | 11/2002 | Pallini et al. ............ | 285/333 |
| 6,511,102 | B2 * | 1/2003 | Krug et al. .............. | 285/333 |
| 6,626,471 | B2 * | 9/2003 | Mallis ..................... | 285/334 |
| 6,682,107 | B2 | 1/2004 | Munk et al. | |
| 6,832,789 | B2 * | 12/2004 | Church ................... | 285/333 |
| 7,334,821 | B2 * | 2/2008 | Dutilleul et al. ......... | 285/333 |
| 7,585,002 | B2 * | 9/2009 | Curley et al. ........... | 285/333 |
| 7,798,536 | B2 * | 9/2010 | Hashem et al. ......... | 285/333 |
| 7,931,311 | B2 * | 4/2011 | Dubedout et al. ....... | 285/333 |
| 8,011,698 | B2 * | 9/2011 | Verger et al. ............ | 285/333 |
| 8,029,025 | B1 * | 10/2011 | Sivley et al. ............ | 285/333 |
| 8,038,179 | B2 * | 10/2011 | Takano et al. ........... | 285/333 |
| 8,056,940 | B2 * | 11/2011 | Morgan et al. .......... | 285/333 |
| 8,079,623 | B2 | 12/2011 | Pallini, Jr. et al. | |
| 8,146,960 | B2 * | 4/2012 | Dubedout et al. ....... | 285/334 |

FOREIGN PATENT DOCUMENTS

| | | |
|---|---|---|
| DE | 4446806 C1 | 5/1996 |
| EP | 0229861 A1 | 7/1987 |

OTHER PUBLICATIONS

PCT Search Report and Written Opinion dated Nov. 15, 2013 from corresponding Application No. PCT/US2013/056090.

* cited by examiner

*Primary Examiner* — David E Bochna
(74) *Attorney, Agent, or Firm* — Bracewell & Giuliani LLP

(57) ABSTRACT

A pipe connection includes a tubular box having an internal threaded section extending from a rim, and a nose receptacle area joining the threaded section. A box seal surface is formed on the nose receptacle area. A tubular pin has a nose area extending from a pin end, and an external threaded section joining the nose area, the external threaded section mating with the internal threaded section. An annular groove is formed on the nose area between the pin end and the external threaded section. A pin seal surface is located at least partially in the groove for engaging the box seal surface to form a metal to metal sealing engagement.

17 Claims, 6 Drawing Sheets

PROTECTED INTEGRAL METAL TO METAL SEAL

BACKGROUND OF THE INVENTION

1. Field of the Invention

The present invention relates in general to tubular connectors, and in particular to sealing surfaces for forming a seal between a box connector and a pin connector.

2. Brief Description of Related Art

Tubular members are connected to each other for various wellbore operations. The tubular members can be, for example, pipe, drill string, riser sections, casing, and the like. Some of the joints between tubular members can use integral metal-to-metal seals to form a fluid-tight seal between adjacent members. Such integral seals can be employed more rapidly, and at a lower cost, than separate seals that are placed between tubing members during makeup. A disadvantage of integral metal-to-metal seals is that they require high surface finishes and, thus, can tolerate very little damage and still work effectively.

Oilfield equipment is large and cumbersome which can make gentle handling difficult. For example, large tubular members must be transported, positioned, and joined together using heavy equipment. Movement of the equipment and the tubular members themselves can cause damage to the sealing surfaces. Even a low-speed contact between a tubular member and another piece of equipment can cause damage because the large mass, even moving at a very low velocity, can create enough force to damage a seal. Therefore, metal-to-metal seal elements must be protected by additional protectors which add cost and, depending on the protector design, can be lost or removed, thus allowing the metal-to-metal seal to be exposed to damage. Therefore, it is desirable to protect a sealing surface without requiring additional protectors. Also, protection of the sealing surfaces is needed during final make up after the pin and box are stabbed together.

SUMMARY OF THE INVENTION

A tubular connection has a tubular box having an internal threaded section extending from a rim, and a nose receptacle area joining the threaded section. A box seal surface is formed in the nose receptacle area. A tubular pin has a nose area extending from a pin end, and an external threaded section joining the nose area, the external threaded section mating with the internal threaded section. An annular groove is located on the nose area between the pin end and the external threaded section. A pin seal surface has a recessed portion located in the groove that engages the box seal surface to form a metal to metal sealing engagement.

In one embodiment, prior to engagement of the pin with the box, a maximum outer diameter of the pin seal surface is greater than a minimum inner diameter of the box seal surface, causing deformation of the pin seal surface and the box seal surface when in engagement with each other. In one embodiment, the pin seal surface has an exposed portion located on the nose area, the recessed and exposed portions joining each other to define a rounded convex surface.

The groove defines for the nose area a first nose section extending from the pin end to the groove, and a second nose section extending from the groove to the pin threaded section. The pin seal surface is located at a junction of the groove with the first nose section. The first nose section may be conical at the junction. The second nose section may also be conical. An angle of the second nose section relative to an axis of the pin may be the same as an angle of the first nose section to the axis at the junction.

At least a portion of the box seal surface may be cylindrical. A conical lead-in surface may extend to the cylindrical portion.

The first nose section from the pin end to the pin seal surface may be spaced radially apart from the nose receptacle when the pin is made up with the box.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 5a is an enlarged sectional view of a portion of the tubular members of FIG. 5, showing the pin axially and angularly offset from the box as the pin is stabbed into the box.

FIG. 5b is an enlarged sectional view similar to FIG. 5a, but showing the pin axially offset but angularly aligned with the box.

FIG. 5c is an enlarged sectional view similar to FIGS. 5a and 5b, but showing angularly misaligned with the box a different angle than in FIG. 5a.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
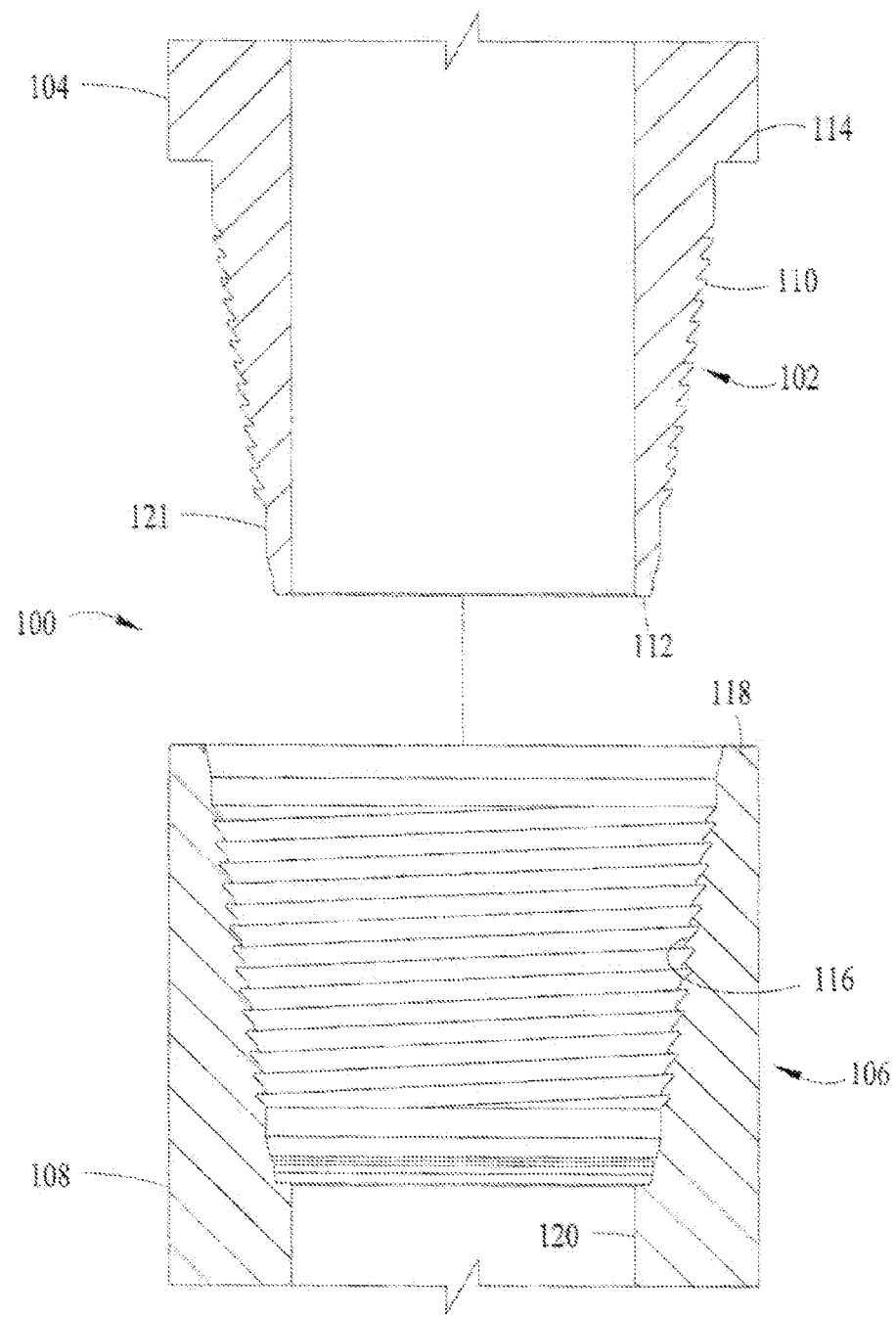
FIG. 1 is a partially sectional isometric view of a connection between tubular members according to an embodiment of the invention.

Referring to FIG. 1, the tubular connection or pipe joint 100 of a pin member ("pin") 102 and box member ("box") 106 is shown. Pin 102 is a connector on tubular member 104, and box 106 is a connector on tubular member 108. Tubular members 104 and 108 can be any type of tubular member including, for example, pipe, riser sections, drill string sections, and casing. Tubular members 104 and 108 can each have connectors at each end such as pin 102 atone end and box 106 at the other end. Pin 102 has an external thread 110 that extends downward from pin cylindrical body 114 toward a pin end 112. A pin nose area 121 extends from pin end 112 to external thread 110. In a similar manner, box 106 has a cooperative internal thread 116 and extends from a rim or box end 118 to a box bore 120. For description purposes, it is assumed that pin 102 is pointing downward such that pin end 112 is the lowermost portion of pin 102, and box 106 is pointing upward such that box end 118 is the uppermost portion of box 106. The relative positions described in this specification, such as "above" or "below" or for description only. The components described can be used in any orientation.

Figure 2:
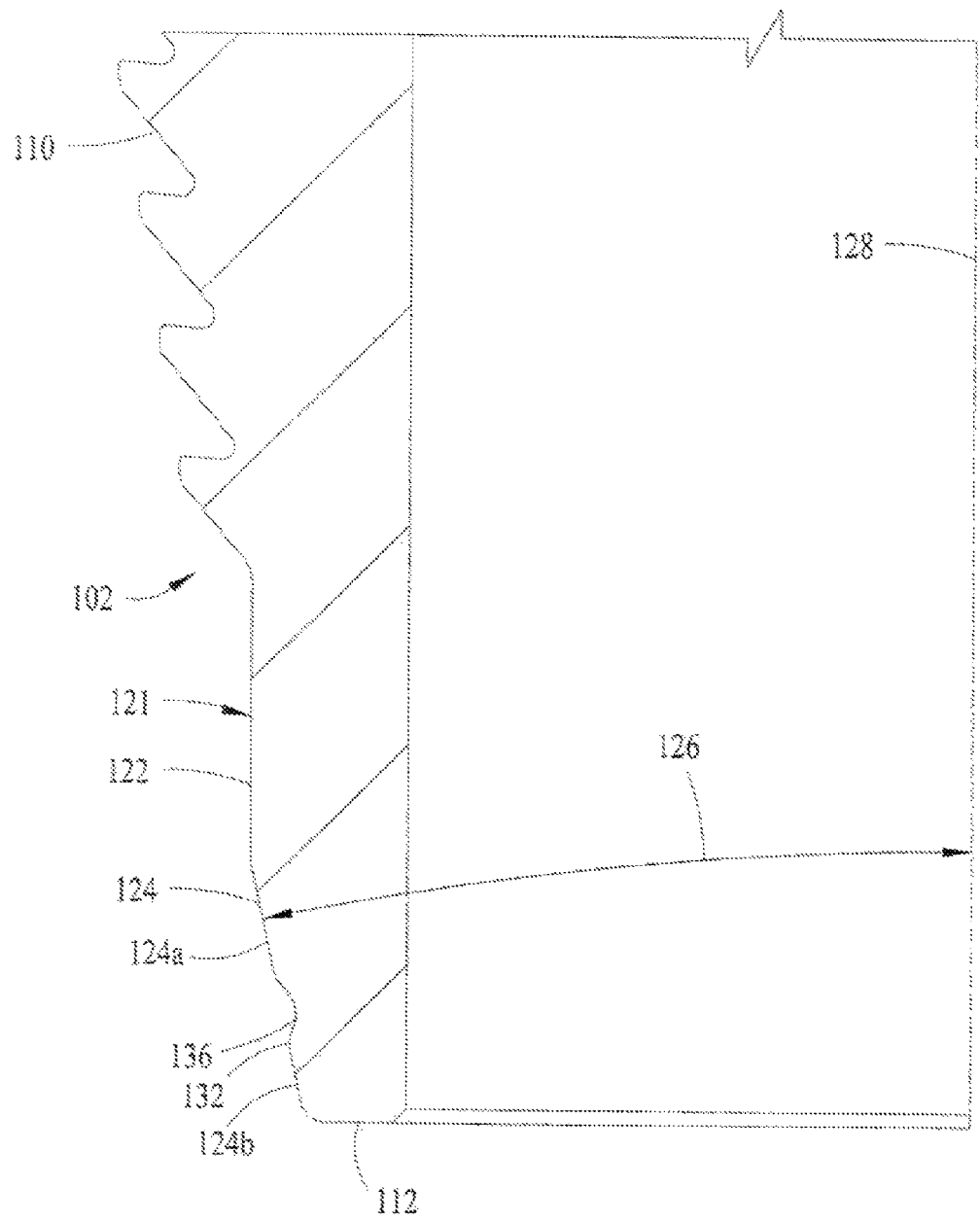
FIG. 2 is an enlarged sectional view of the pin member of FIG. 1.
Figure 6:
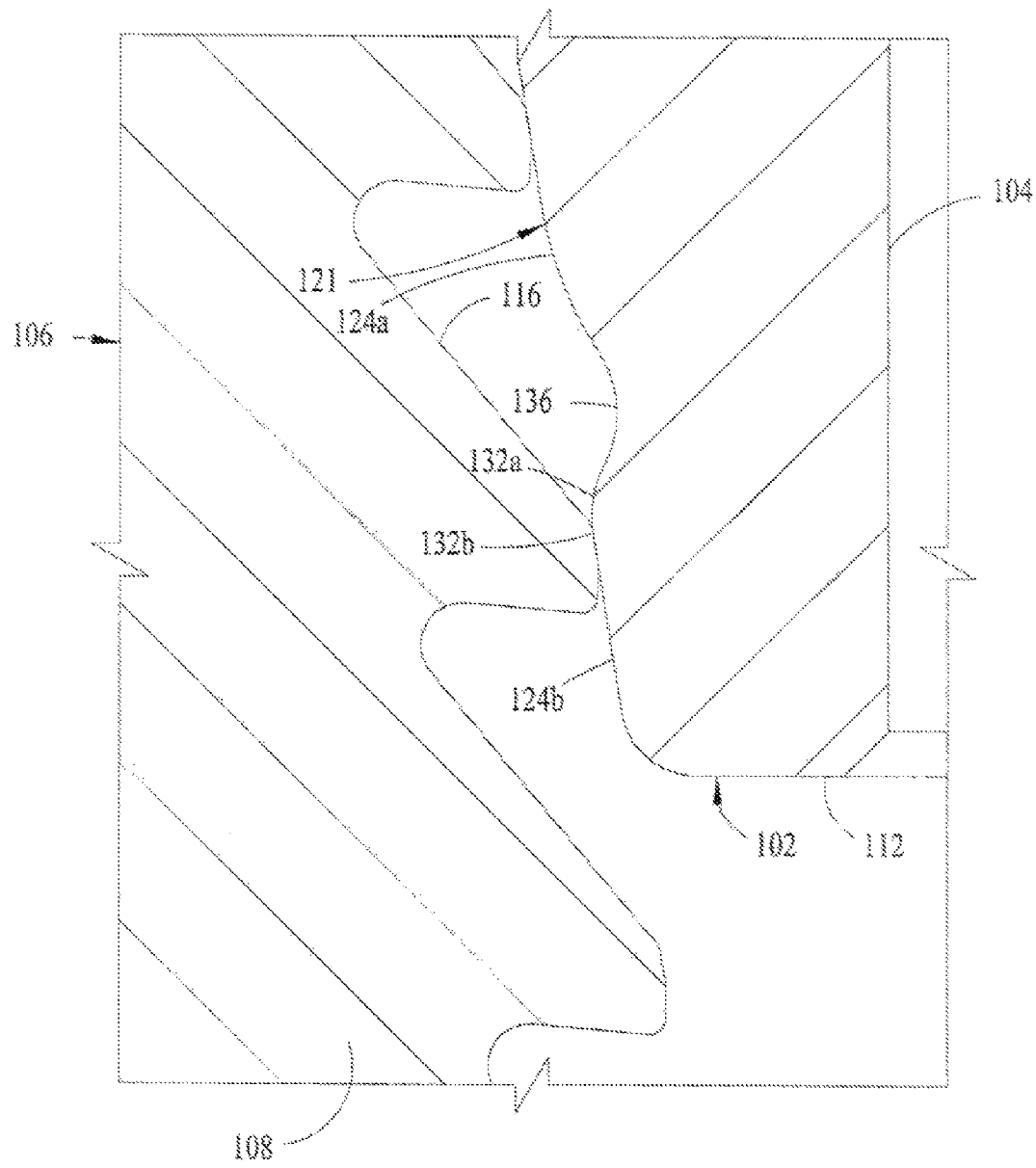
FIG. 6 is a sectional side view of the tubular members of FIG. 1 showing an example of the pin member in contact with threads during makeup.

Referring also to FIG. 2 and FIG. 6, an enlarged view of a lower portion of pin 102 is shown. Pin 102 is a connector on an end of tubular member 104 (FIG. 1). Pin nose area 121 may have a conical alignment or nose surface 124 extending upward from pin end 112 to a nose cylindrical surface 122. Nose cylindrical surface 122 joins conical alignment surface 124 and extends upward to external threads 110. Cylindrical surface 122 is concentric relative to relative to pin axis 128. All or part of conical alignment surface 124 may be at a same angle 126 relative to pin axis 128. A curved recess or annular groove 136 is located on nose conical alignment surface 124. Groove 136 is located is located a selected distance above pin end 112, dividing alignment surface 124 into a lower conical alignment surface 124a and an upper conical alignment surface 124b.

Figure 4:
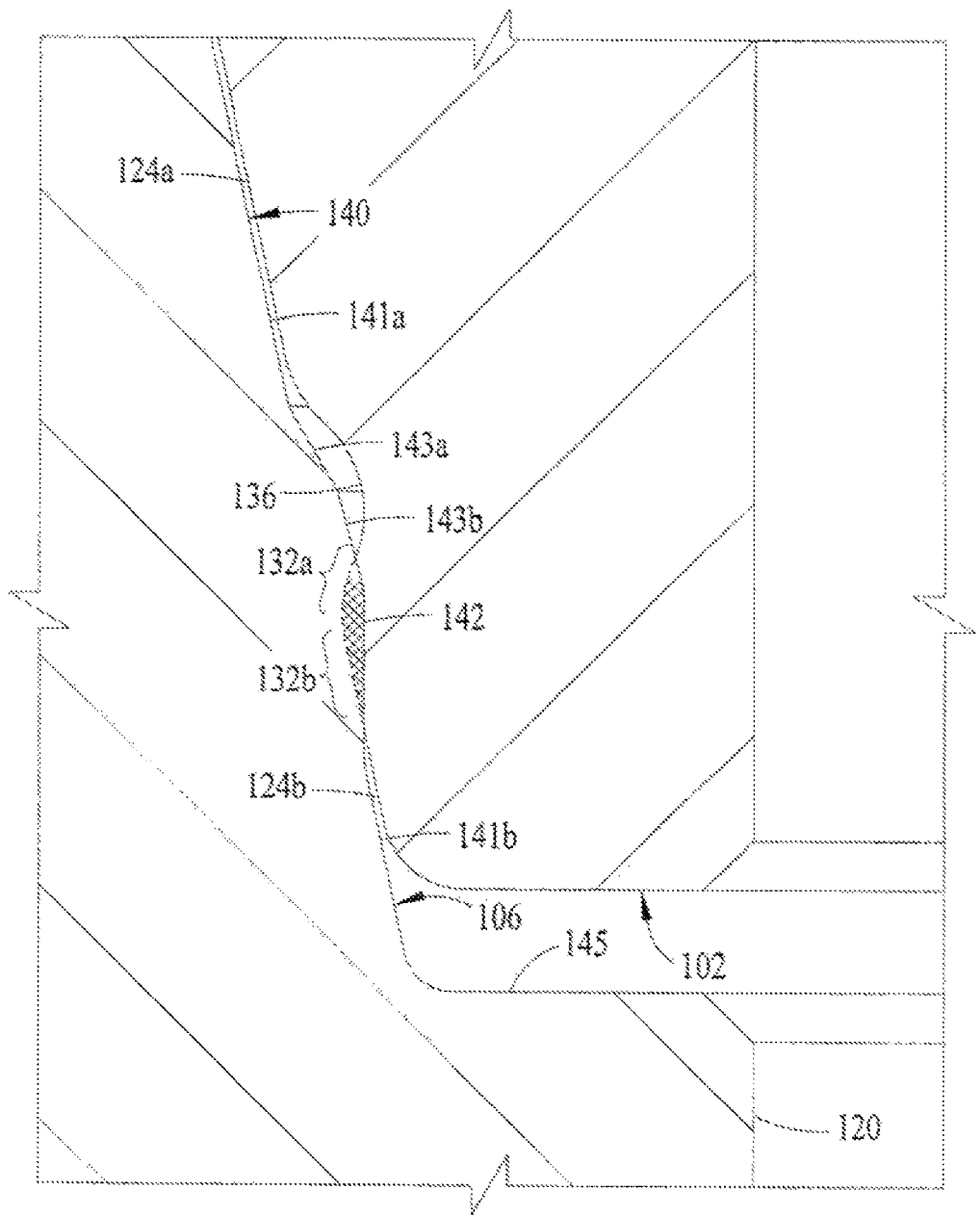
FIG. 4 is a sectional side view of the seal interface of the connection between tubular members of FIG. 1.

A pin seal surface 132 has a portion located partially in groove 136 and partially on lower conical alignment surface 124b. As illustrated in FIGS. 4 and 6, the recessed portion 132a of seal surface 132 located in groove 136 is conical with a diameter increasing in a downward direction. The exposed portion 132b of seal surface 132, which is located on lower alignment surface 124b, is also conical but has a diameter that decreases in a downward direction. Portions 132a and 132b define a rounded convex seal surface. Exposed portion 132b can be a portion of alignment surface 124b that is flush with alignment surface 124b, thus extending at the same angle 126 relative to pin axis 128. Alternately exposed pin seal surface 132b can protrude outward from alignment surface 124b. Pin seal surface 132, groove 136 and alignment surface 124 are a monolith part. In other embodiments, pin seal surface 132 can be an inlay of a dissimilar material on groove 136 and alignment surface 124b. Pin seal surface 132 can be polished to a smoother finish than other portions of groove 136 and lower alignment surface 124b, or pin seal surface 132 can have the same surface finish as other portions of alignment surface 124b and groove 136.

Groove 136 may have a continuously curved concave shape as shown. Recessed pin seal surface 132a has an upper margin that is located about half-way between the base of groove 136 and the lower edge of groove 136. Because pin seal surface 132 is located at the transition from lower alignment surface 124b to groove 136, pin seal surface 132 has a generally convex shape. The outer diameter of pin seal surface 132 at its upper margin within groove 136 is less than the outer diameter of pin seal surface 132 where groove 136 joins lower alignment surface 124b. The outer diameter of pin seal surface 132 at its lower margin on lower alignment surface 124b may be the same or less than the outer diameter of seal surface 132 at its upper margin within groove 136.

Figure 3:
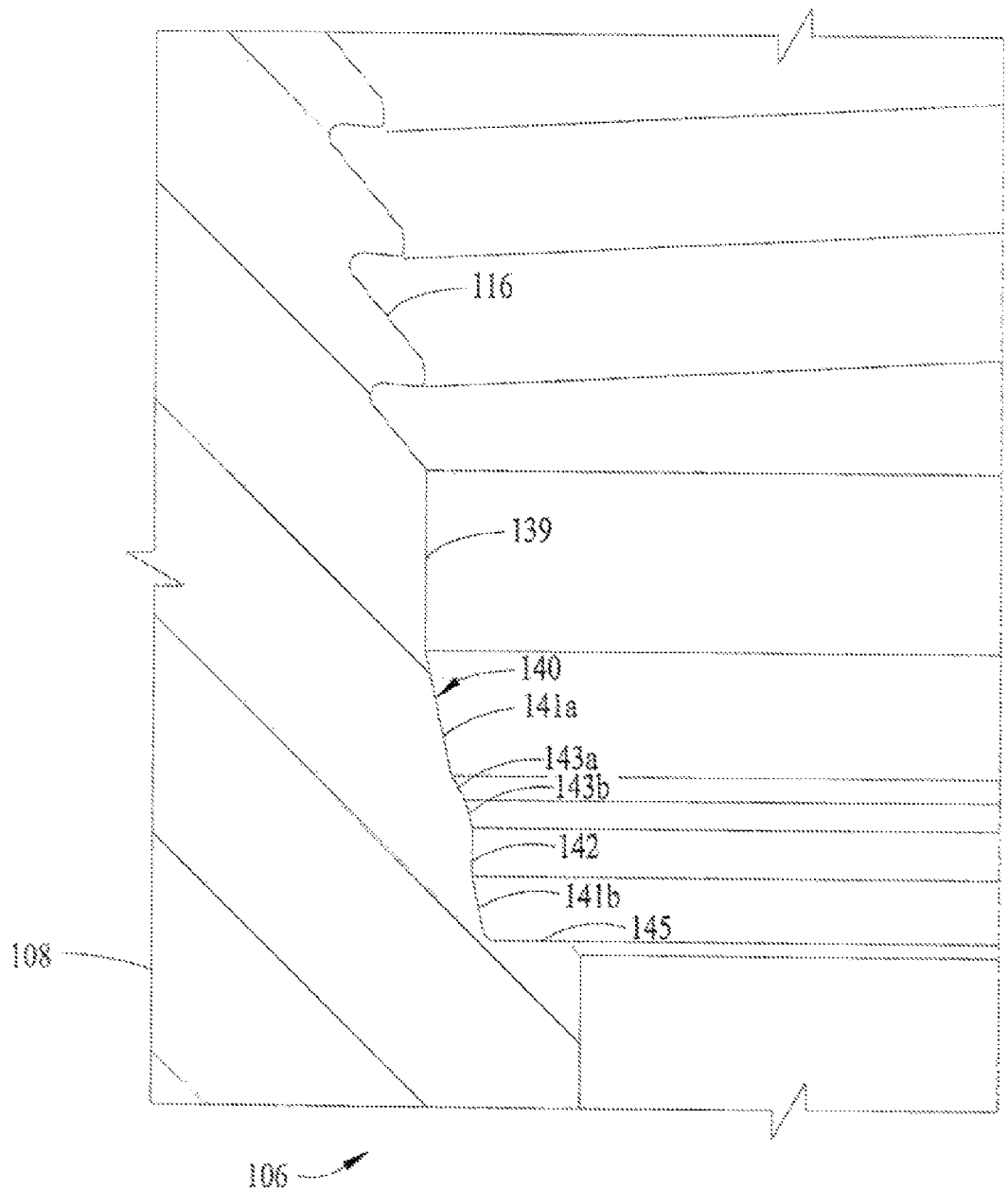
FIG. 3 is an enlarged sectional view of the box member of FIG. 1.

Referring to FIG. 3, an enlarged view of box 106 is shown. Box 106 is a cylindrical connector on an end of tubular member 108 (FIG. 1). A nose receptacle area 140 extends downward from internal thread 116. Nose receptacle area 140 may have a cylindrical section 139 extending downward from internal thread 116 a selected distance. In this example, an upper conical alignment section 141a joins and extends downward from nose receptacle cylindrical section 139. Also, in this example, an upper conical lead-in section 143a extends downward at a lesser angle from upper alignment section 141a. A lower conical lead-in section 143b extends downward at a lesser angle from upper lead-in section 143b. A cylindrical box seal surface 142 joins and extends downward from lower lead-in section 143b. In this example, box seal surface 142 joins a conical lower alignment surface 141b that extends to a shoulder 145 that is in a plane perpendicular to the axis of box 108. Upper and lower alignment surfaces 141a, 141b are illustrated as being at the same conical angle and same conical surface, except being separated by lead-in surfaces 143a, 143b and box seal surface 142. Lead-in surface 143a, 1423b and box seal surface 142 are located radially inward from a line extending between the conical alignment surfaces 141a, 141b at the same angle as conical alignment surfaces 141a, 141b. Although shown as straight separate conical surfaces, alignment surfaces 141a, 141b and lead-in surfaces 143a, 143b may blend together and have a variety of shapes. Also, box seal surface 142 may be other than cylindrical, such as a rounded, convex contoured surface.

Box seal surface 142 can be axially located such that when external thread 110 of pin 102 engages internal thread 116 of box 106, and pin 102 (FIG. 2) is tightened to a predetermined position or predetermined amount of torque, pin seal surface 132 (FIGS. 2, 4) is axially aligned with box seal surface 142. Pin 102 is in a sealing position when pin 102 is tightened into box 106 such that pin seal surface 132 engages box seal surface 142, as best shown in FIG. 4.

Box seal surface 142 can be attached to nose receptacle 140 by, for example, welding or as an inlay positioned in and protruding from a groove (not shown). Box seal surface 142 can be polished to have a smoother surface finish than other portions of nose receptacle 140. In some embodiments, box seal surface 142 can have a generally convex cross section. The minimum inner diameter of box seal surface 142 is less than any portion of nose receptacle 140 located above it. The inner diameter of box seal surface 142 can be smaller than the outer diameter of pin seal surface 132 prior to making up pin 102 with box 106. The difference in diameters causes an interference fit, as illustrated in FIG. 4 by the hatch marks. The interference fit causes deformation of both pin seal surface 132 and box seal surface 142. The deformation may be elastic, allowing the connector to be broken out and made-up more than one time. Alternately, the deformation may be plastic or permanent. The amount of deformation due to the interference fit may be very slight and is highly exaggerated in FIG. 4.

Referring to FIG. 4, as pin 102 moves into the sealing position, pin seal surface 132 conforms to and seals against box seal surface 142. Both recessed pin seal surface 132a and exposed seal surface 132b sealingly engage box seal surface 142. When in the fully sealed position of FIG. 4, box lower alignment surface 141b is radially spaced from pin lower alignment surface 124b, creating a gap. Also, box upper alignment surface 141a is radially spaced from pin upper alignment surface 141a.

Figure 5:
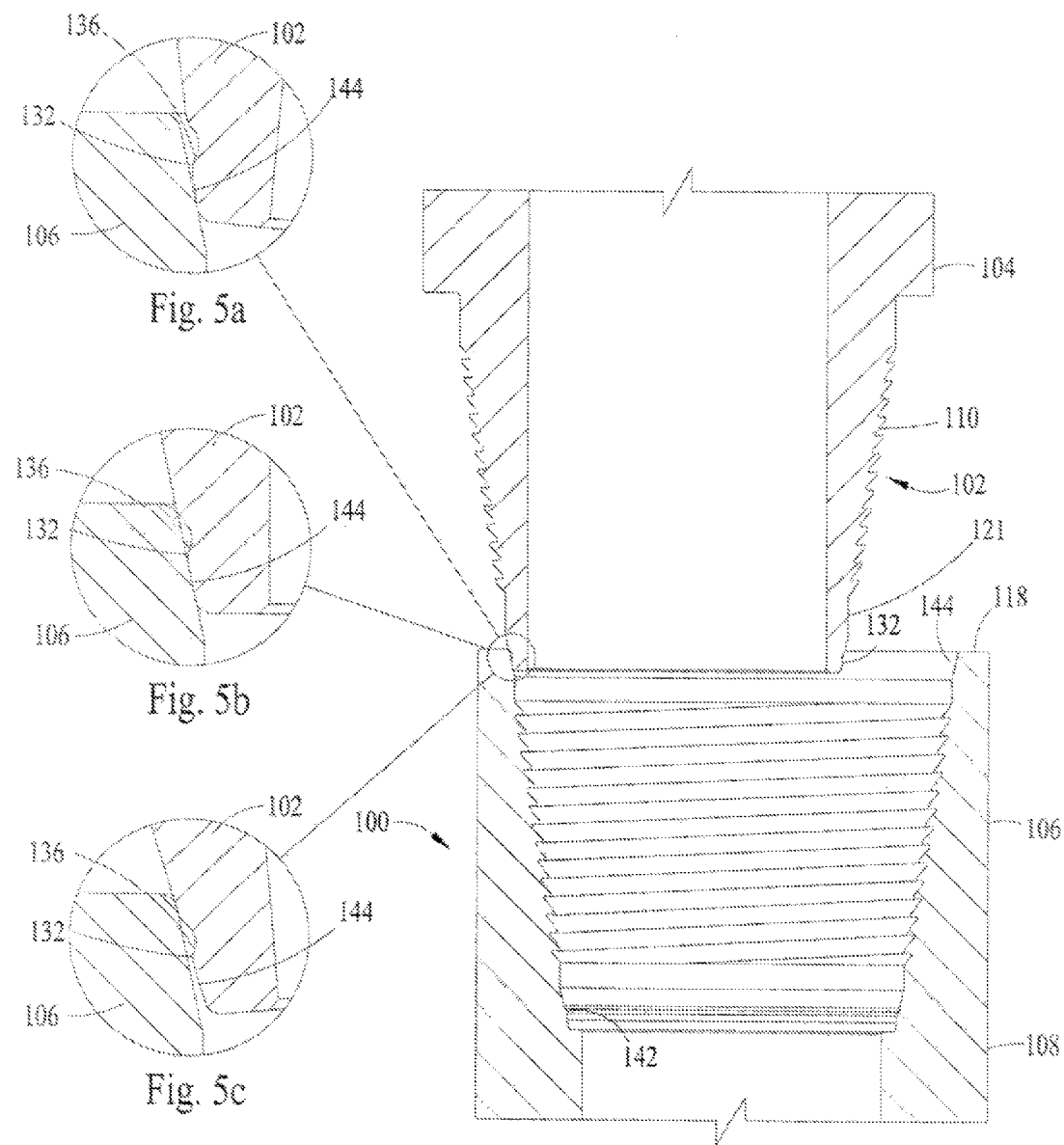
FIG. 5 is a sectional side view of the tubular members of FIG. 1, showing the pin in an axially offset position during makeup with the box.

Referring to FIGS. 5, 5a, 5b, and 5c, during make-up, tubular member 104 can inadvertently be offset from and angularly out of alignment with tubular member 108, such that elements of pin 102 contact various portions of the interior of box 106 before being aligned and threadingly engaging box 106, A chamfer 144 can be located at box end 118, and can be used to guide pin 102 into concentric alignment with box 106. As shown in FIG. 5, the exposed portion of pin seal 132 is likely to contact chamfer 144 during insertion. The impact and subsequent sliding engagement can result in damage to the surfaces in contact. The recessed portion 132a (FIGS. 4 and 6) of seal surface 132, however, does not contact any portion of box 106 during insertion, until pin 102 is in the sealing position. Even if pin 102 is angularly misaligned as shown in FIGS. 5a and 5c, the recessed portion of seal surface 132 will not contact any portion of the interior of box 106.

FIG. 6 illustrates a condition during stab-in wherein pin lower alignment surface 124b contacts internal thread 116 of box 106. The recessed portion 132a of the pin seal surface is prevented from contacting internal thread 116 because it is located within groove 136. As nose area 121 of pin 102 contacts inner diameter surfaces of box 106, recessed pin seal surface 132a is isolated from contacting internal surfaces of box 106. Referring back to FIG. 1, when tubular member 104 is concentrically aligned with tubular member 108, external thread 110 can engage internal thread 116, thereby axially advancing pin 102 into box 106. Continued axial advancement results in pin seal surface 132 being axially and concentrically aligned with box seal surface 142, resulting in inward deformation of pin seal surface 132 and outward deflection of box seal surface 142.

While the invention has been shown or described in only some of its forms, it should be apparent to those skilled in the art that it is not so limited, but is susceptible to various changes without departing from the scope of the invention.

What is claimed is:

1. A tubular connection comprising:
a tubular box having an internal threaded section extending from a rim, and a nose receptacle area joining the threaded section;
a box seal surface formed on the nose receptacle area;
a tubular pin having a nose area extending from a pin end, and an external threaded section joining the nose area, the external threaded section mating with the internal threaded section;
an alignment surface defined on the nose area, the alignment surface tapered to decrease in a direction toward the pin end from the external threaded section such that the alignment surface is operable to engage the internal threaded section of the tubular box to concentrically align the tubular pin with the tubular box when the tubular pin is stabbed into the tubular box;
an annular groove on the alignment surface between the pin end and the external threaded section; and
a pin seal surface having a recessed portion located in the groove that engages the box seal surface to form a metal to metal sealing engagement;
wherein the first nose section from the pin end to the pin seal surface is spaced radially apart from the nose receptacle when the pin is made up with the box.

2. The tubular connection of claim 1, wherein prior to engagement of the pin with the box, a maximum outer diameter of the pin seal surface is greater than a minimum inner diameter of the box seal surface, causing deformation of the pin seal surface and the box seal surface when in engagement with each other.

3. The tubular connection of claim 1, wherein the pin seal surface has an exposed portion located on the nose area, the recessed and exposed portions joining each other to define a rounded convex surface.

4. The tubular connection of claim 1, wherein:
the groove defines for the nose area a first nose section extending from the pin end to the groove, and a second nose section extending from the groove to the pin threaded section; and
the pin seal surface is located at a junction of the groove with the first nose section.

5. The tubular connection of claim 4, wherein the first nose section is conical at the junction.

6. The tubular connection of claim 5, wherein:
the second nose section is conical.

7. The tubular connection of claim 6, wherein an angle of the second nose section relative to an axis of the pin is the same as an angle of the first nose section to the axis at the junction.

8. The tubular connection of claim 1, wherein at least a portion of the box seal surface is cylindrical.

9. A tubular connection comprising:
a tubular box having an internal threaded section extending downward from a rim, and a nose receptacle area joining a lower end of the threaded section;
a box seal surface formed on the nose receptacle area, defining an upper nose receptacle section above the box seal surface and a lower nose receptacle section below the box seal surface, at least a portion of the box seal surface being cylindrical and having an inner diameter less than any portion of the upper nose receptacle;
a tubular pin having a nose area extending upward from a pin end, and an external threaded section joining and extending upward from the nose area, the external threaded section mating with the internal threaded section;
an alignment surface defined on the nose area, the alignment surface tapered to decrease in a direction toward the pin end from the external threaded section such that the alignment surface is operable to engage the internal threaded section of the tubular box to concentrically align the tubular pin with the tubular box when the tubular pin is stabbed into the tubular box;
an annular groove on the alignment surface between the pin end and the external threaded section, defining an upper nose section between the groove and the external threaded section and a lower nose section between the pin end and the groove; and
a pin seal surface having an upper margin within the groove and a lower margin on the lower nose section, the portion of the pin seal surface within the groove engaging the cylindrical portion of the box seal surface to form a metal to metal sealing engagement.

10. The tubular connection of claim 9, wherein prior to engagement of the pin with the box, a maximum outer diameter of the pin seal surface is greater than the inner diameter of the cylindrical portion of the box seal surface, causing deformation of the pin seal surface and the box seal surface when in engagement with each other.

11. The tubular connection of claim 9, wherein the pin seal surface is rounded and convex.

12. The tubular connection of claim 9, wherein:
the portion of the pin seal surface located on the lower nose section is conical.

13. The tubular connection of claim 9, wherein the upper and lower nose sections are conical and formed at a same angle relative to an axis of the pin.

14. The tubular connection of claim 9, wherein the portion of the lower nose section from the pin seal surface to the pin end is spaced radially apart from the nose receptacle when the pin is made up with the box.

15. The tubular connection of claim 9, further comprising:
a conical lead-in surface formed in the nose receptacle of the box at an upper end of the cylindrical portion of the box seal surface.

16. The tubular connection of claim 9, wherein:
the portion of the pin seal surface located within the groove is isolated from contact with any portion of the box during stabbing of the pin into the box prior to rotation of the box regardless of any misalignment of an axis of the pin with an axis of the box.

17. A tubular connection comprising:
a tubular box having an internal threaded section extending from a rim, and a nose receptacle area joining the threaded section;
a box seal surface formed on the nose receptacle area;
a tubular pin having a nose area extending from a pin end, and an external threaded section joining the nose area, the external threaded section mating with the internal threaded section;
an alignment surface defined on the nose area, the alignment surface tapered to decrease in a direction toward the pin end from the external threaded section such that the alignment surface is operable to engage the internal threaded section of the tubular box to concentrically align the tubular pin with the tubular box when the tubular pin is stabbed into the tubular box;
an annular groove on the alignment surface between the pin end and the external threaded section, the annular groove defining for the nose area a first nose section extending from the pin end to the annular groove, and a second nose section extending from the annular groove to the pin threaded section; and
a pin seal surface having a recessed portion located in the annular groove that engages the box seal surface to form a metal to metal sealing engagement, the pin seal surface is located at a junction of the annular groove with the first nose section;
wherein the first the first nose section is conical at the junction and the second nose section is conical, and wherein an angle of the second nose section relative to an axis of the pin is the same as an angle of the first nose section to the axis at the junction.

\* \* \* \* \*